United States Patent
Tong et al.

(10) Patent No.: US 7,840,843 B2
(45) Date of Patent: Nov. 23, 2010

(54) SYSTEM AND METHOD FOR TESTING AN EMBEDDED SYSTEM

(75) Inventors: Mo-Ying Tong, Shenzhen (CN); Hua Dong, Shenzhen (CN); Xue-Wen Hong, Shenzhen (CN); Chiang-Chung Tang, Taipei Hsien (TW); Hong-Bo Zhao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 256 days.

(21) Appl. No.: 12/198,040

(22) Filed: Aug. 25, 2008

(65) Prior Publication Data

US 2009/0132857 A1    May 21, 2009

(30) Foreign Application Priority Data

Nov. 20, 2007    (CN) .......................... 2007 1 0202599

(51) Int. Cl.
*G06F 11/00* (2006.01)
(52) U.S. Cl. ............................. 714/27; 714/25; 714/26; 714/48
(58) Field of Classification Search .................... 714/25, 714/26, 27, 48
See application file for complete search history.

(56) References Cited

U.S. PATENT DOCUMENTS

| 7,073,094 | B1 * | 7/2006 | Jackson et al. ................. 714/30 |
| 7,152,027 | B2 * | 12/2006 | Andrade et al. .............. 703/21 |
| 2007/0011522 | A1 * | 1/2007 | Denniston .................... 714/724 |
| 2008/0128715 | A1 * | 6/2008 | Williams et al. .............. 257/88 |

FOREIGN PATENT DOCUMENTS

| CN | 1967498 A | 5/2007 |
| KR | 10-2006-0062939 A | 6/2006 |
| KR | 10-2006-0066578 A | 6/2006 |

* cited by examiner

*Primary Examiner*—Robert W. Beausoliel, Jr.
*Assistant Examiner*—Charles Ehne
(74) *Attorney, Agent, or Firm*—Frank R. Niranjan

(57) ABSTRACT

A testing system for an embedded system is provided. The testing system includes a plurality of devices and one or more host computers. Each device, which includes the embedded system to be tested, is connected to the host computer via a network based on the network file system protocol. The host computers are further connected with a control server, and each of the host computers comprises a root file system. The control server is configured for providing an interface for a user to set test parameters, controlling each of the host computers to invoke a test program, thereby testing the embedded system according to the test parameters, and receiving test results of the embedded system from the host computer. A related testing method is also provided.

12 Claims, 3 Drawing Sheets

SYSTEM AND METHOD FOR TESTING AN EMBEDDED SYSTEM

BACKGROUND

1. Field of the Invention

Embodiments of the present disclosure relate to computer assisted test systems, and particularly to a system and method for testing an embedded system.

2. Description of Related Art

An embedded system is a special-purpose computer system designed to perform one or more dedicated functions. Embedded systems are usually embedded as part of a complete device including hardware and mechanical parts. Embedded systems range from systems having no display terminals to systems having display terminals similar to desktop operating systems in devices, such as personal digital assistants (PDAs).

It is necessary to verify design and operation of embedded systems. At present, there are mainly two modes to test embedded systems. One such mode includes executing test programs in a device with an embedded system, and displaying test results on a display terminal of the embedded system. Application of this test mode is very constrictive, since it can only be applied towards embedded systems having display terminals.

Another such test mode includes connecting a device with an embedded system to a host computer having a user interface via a network, loading a test program to memory (e.g., a flash read only memory) of the device, executing client programs of the test program on the host computer to enable the test programs in the memory of the device, feeding back test results from the device, and showing the test results on the user interface of the host computer. This test mode is widely used now, especially towards embedded systems having no display terminals. However, the second test mode also have drawbacks: Firstly, loading test programs to the device takes much test time. Secondly, the test program takes up much memory space of the device. Thirdly, since the device and the host computer are two independent systems, the test results may not be displayed when one of the two devices (i.e., the device and the host computer) does not work normally.

What is needed, therefore, is a testing system and method for an embedded system, which can deduce test time, save memory space of the device and improve test efficiency.

SUMMARY

A testing system for an embedded system is provided. The testing system includes a plurality of devices and one or more host computers. Each device, which includes the embedded system to be tested, is connected to the host computer via a network based on the network file system protocol. The host computers are further connected with a control server, and each of the host computers comprises a root file system. The control server is configured for providing an interface for a user to set test parameters, controlling each of the host computers to invoke a test program, thereby testing the embedded system according to the test parameters, and receiving test results of the embedded system from the host computer.

Other objects, advantages and novel features will become more apparent from the following detailed description of certain embodiments of the present disclosure when taken in conjunction with the accompanying drawings, in which:

DETAILED DESCRIPTION OF CERTAIN INVENTIVE EMBODIMENTS

Figure 1:
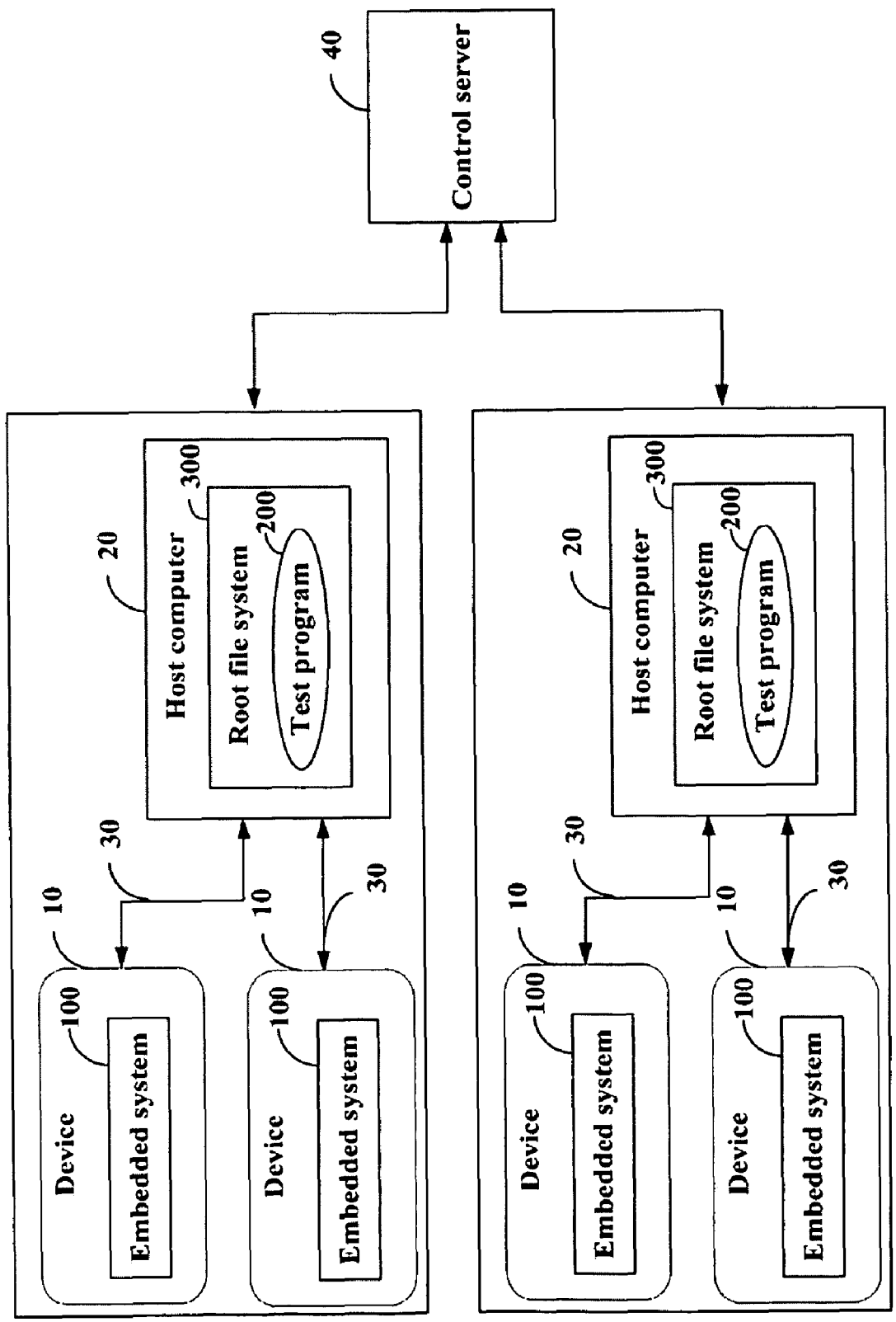
FIG. 1 is a block diagram of one embodiment of a system for testing an embedded system.

FIG. 1 is a block diagram of one embodiment of a system for testing an embedded system 100. The system comprises a plurality of devices 10 and one or more host computers 20. Each device 10 is connected to the host computer 20 via a network 30 and comprises the embedded system 100 to be tested. In one embodiment, the network may be based on the network file system (NFS) protocol. The host computers 20 are further connected with a control server 40, and each of the host computers 20 comprises a root file system 300. The control server 40 is configured for providing an interface for a user to set test parameters, controlling each of the host computers 20 to invoke a test program 200, thereby testing the embedded system 100 according to the test parameters, and receiving test results of the embedded system 100 from the host computer 20.

It may be understood that the root file system 300, in one embodiment, comprises a boot mount system on which all the other file systems are mounted (i.e., logically attached to the system) as the host computer 20 is booted up (i.e., started up). The root file system 300 comprises the test program 200 for testing various parameters of the embedded system 100 as will be further detailed below. The test program 200 may be embedded in the root file system 300 so as to provide very fast, flexible, and powerful control when testing the embedded system 100.

Figure 2:
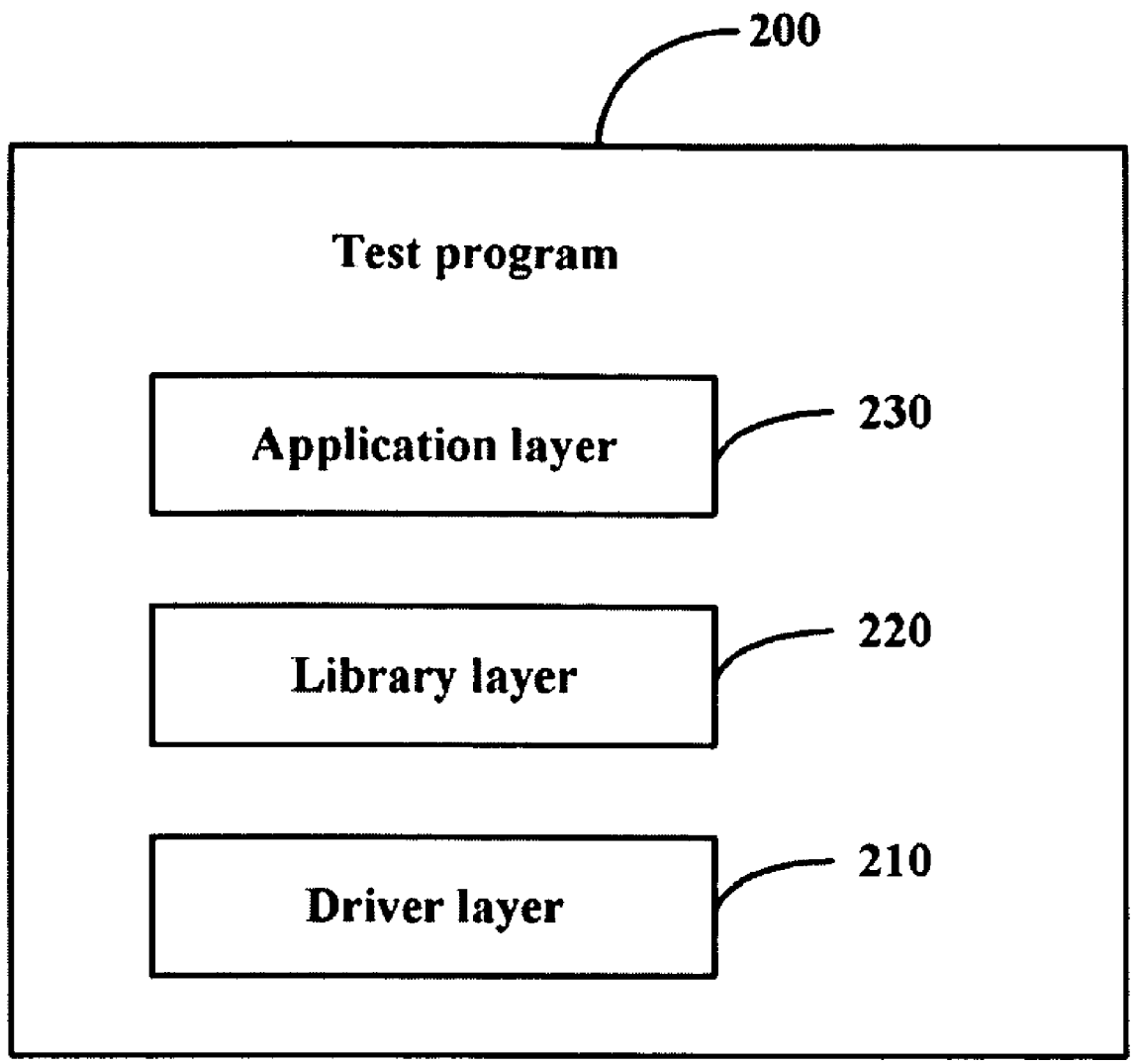
FIG. 2 illustrates function modules of a test program in FIG. 1.

As shown in FIG. 2, the test program 200, in one embodiment, comprises a driver layer 210, a library layer 220, and an application layer 230. The driver layer 210 is configured for driving hardware of the embedded system 100 to test the embedded system 100. The library layer 220 comprises a set of test modules programmed for testing the software and hardware of the embedded system 100. The application layer 230 is configured for calling certain test modules to test corresponding software and hardware of the embedded system 100 according to the test parameters. One or more general purpose or specialized processors, such as a processor in the host computer 20 executes the driver layer 210, the library layer 220, and the application layer 230. A detailed description of how the test program 200 tests each of the embedded systems 100 is described below.

The embedded system 100 communicates with the root file system 200 of the host computer 20 using the NFS protocol. It may be understood that the NFS protocol is a client/server system that allows users to access files across a communication system and treat those files as if they resided in a local file directory of either the client or the sever, Thus, when the embedded system 100 is started up, the device 10 shares a local file directory with the root file system 300 in the host computer 20 via the network 30. Accordingly, the host computer 20 may access the device 10 via the network 30 and use the test program 200 to test the embedded system 100 according to one or more test parameters. The host computer 20 may then acquire the test results of the embedded system 100 from the device 10, and report the test results to the control server 40.

It may be understood that more host computers 20 may be employed to test a large number of embedded systems 100. In this circumstance, the host computers 20 and the large number of embedded systems 100 can be divided into a plurality of groups, as shown in FIG. 1 where two groups are shown.

Figure 3:
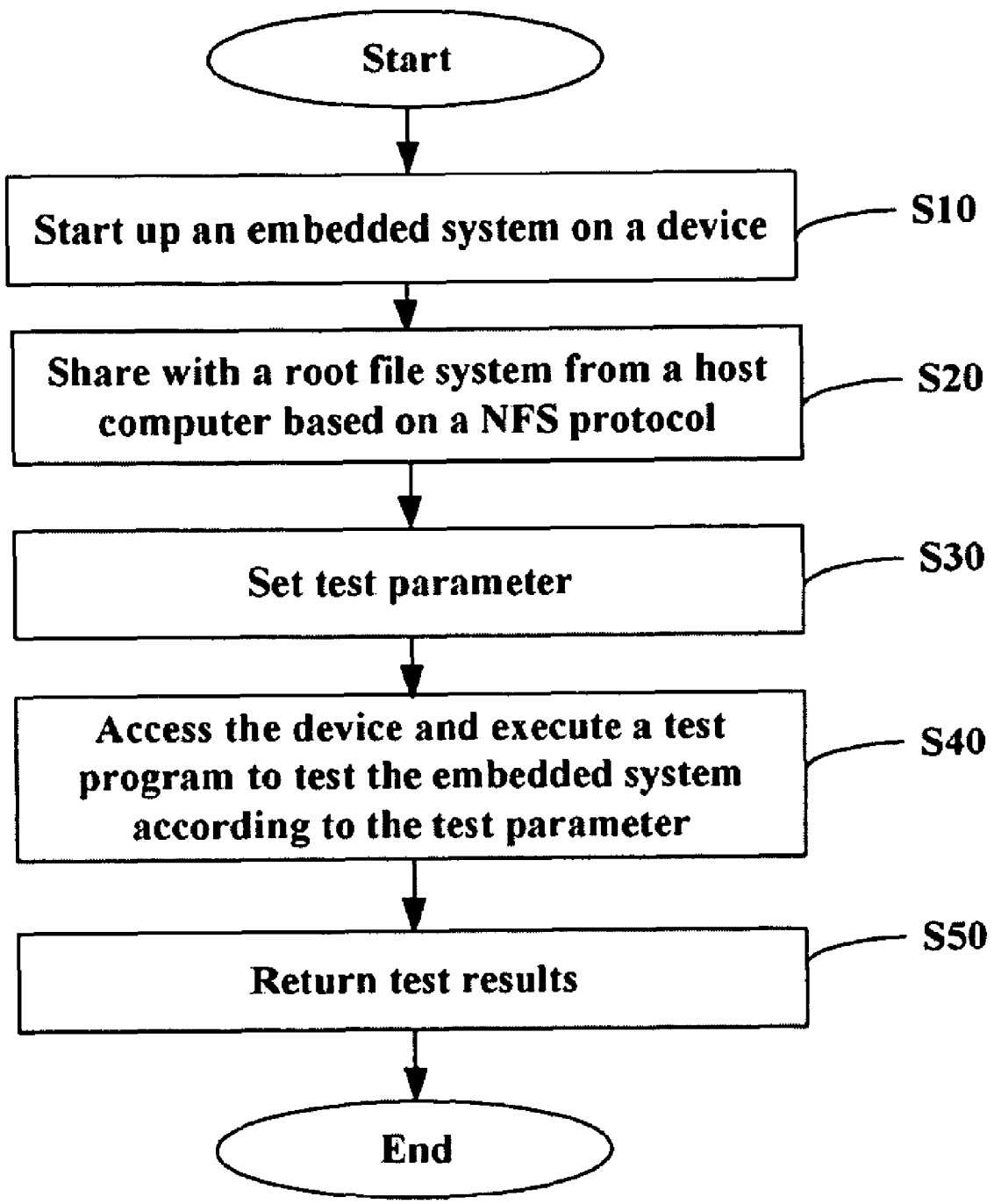
FIG. 3 is a flowchart of one embodiment of a method for testing an embedded system.

FIG. 3 is a flowchart of one embodiment of a method for testing the embedded system 100. The method of FIG. 3 may be used to test various operational parameters of the embedded system using the testing program 200 embedded in the root file system 300 of the host computer 20. Depending on the embodiment, additional blocks may be added, others removed, and the ordering of the blocks may be changed.

In block S10, the embedded system 100 of each device 10 is started up. In block S20, the device 10 shares with the root file system 300 from the host computer 20 via the network 30 based on the NFS protocol.

In block S30, the user may set one or more test parameters via an interface provided by the control server 40 where the control server 40 sends the test parameters to the host computer 20.

In block S40, the host computer 20 accesses the device 10 via the network 30 and the NFS protocol, and executes the test programs 200 on the device 10 to test the embedded system 100 according to the test parameters. In block S50, the host computer 20 receives the test results of the embedded system 100 from the device 10, and reports the test results to the control server 40.

The above-described testing system and method can be widely used for test embedded systems without regarding to whether the embedded systems have display terminals or not. Because the test program 200 is embedded in the root file system 300 of the host computer and communicates with the embedded system 100 via the NFS protocol, much delay is eliminated. It may be appreciated that a root file system 300 is typically very small and highly efficient. Thus, communication with the root file system 300 over the NFS protocol allows more efficient testing of the device 10, particularly when there are a plurality of devices 10 to be tested at one time.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A testing system for testing an embedded system, the testing system comprising:
a plurality of devices, each of the devices comprising an embedded system;
one or more host computers connected to the devices via a network, each of the host computers comprising a root file system comprising a test program; and
a control server connected to each of the host computers; wherein:
each of the devices shares the root file system on each of the host computers based on the network file system protocol;
the control server provides an interface for a user to set one or more test parameters, and controls each of the host computers to execute the test program to test the embedded system according to the one or more test parameters; and
each of the host computers executes the test program to test the embedded system according to the one or more test parameters, acquires test results of the embedded system from each of the devices, and reports the test results to the control server.

2. The system as claimed in claim 1, wherein the test program comprises a driver layer configured for driving hardware of the embedded system to test the embedded system.

3. The system as claimed in claim 1, wherein the test program comprises a library layer comprising a set of test modules configured for testing software systems and hardware systems of the embedded system.

4. The system as claimed in claim 3, wherein the test program comprises an application layer configured for calling the test modules to test corresponding software systems and hardware systems of the embedded system according to the one or more test parameters.

5. A computer-based testing method for an embedded system, the method comprising:
starting up a computerized device comprising the embedded system;
sharing a root file system and a test program of a host computer connected with the embedded system via a network based on the network file system protocol;
receiving test parameters from an interface provided by a control server;
executing the test program to test the embedded system according to the test parameters; and
obtaining test results of the embedded system from the device.

6. The method as claimed in claim 5, further comprising: reporting the test results to the control server.

7. A testing system for an embedded system, the testing system comprising:
a plurality of devices, each of the devices comprising an embedded system; and
one or more host computers connected to the devices via a network based on a network file system protocol, wherein
each of the host computers comprising a root file system that comprises a test program;
each of the devices shares with the root file system on each of the host computers based on the network file system protocol; and
each of the host computers executes the test program to test the embedded system according to test parameters set by a user, obtains test results of the embedded system from each of the devices.

8. The system as claimed in claim 7, further comprising a control server being connected to each of the host computers.

9. The system as claimed in claim 8, wherein the control server is configured for providing an interface for the user to set the test parameters, and controlling each of the host computers to execute the test program to test the embedded system according to the test parameters.

10. The system as claimed in claim 7, wherein the test program comprises a driver layer configured for driving hardware of the embedded system to test the embedded system.

11. The system as claimed in claim 7, wherein the test program comprises a library layer comprising a set of test modules programmed for testing software systems and hardware systems of the embedded system.

12. The system as claimed in claim 7, wherein the test program comprises an application layer configured for calling the test modules to test corresponding software systems and hardware systems of the embedded system according to the test parameters.

* * * * *